C. A. LANGFORD.
RESILIENT WHEEL.
APPLICATION FILED JULY 28, 1910.
997,302.
Patented July 11, 1911.
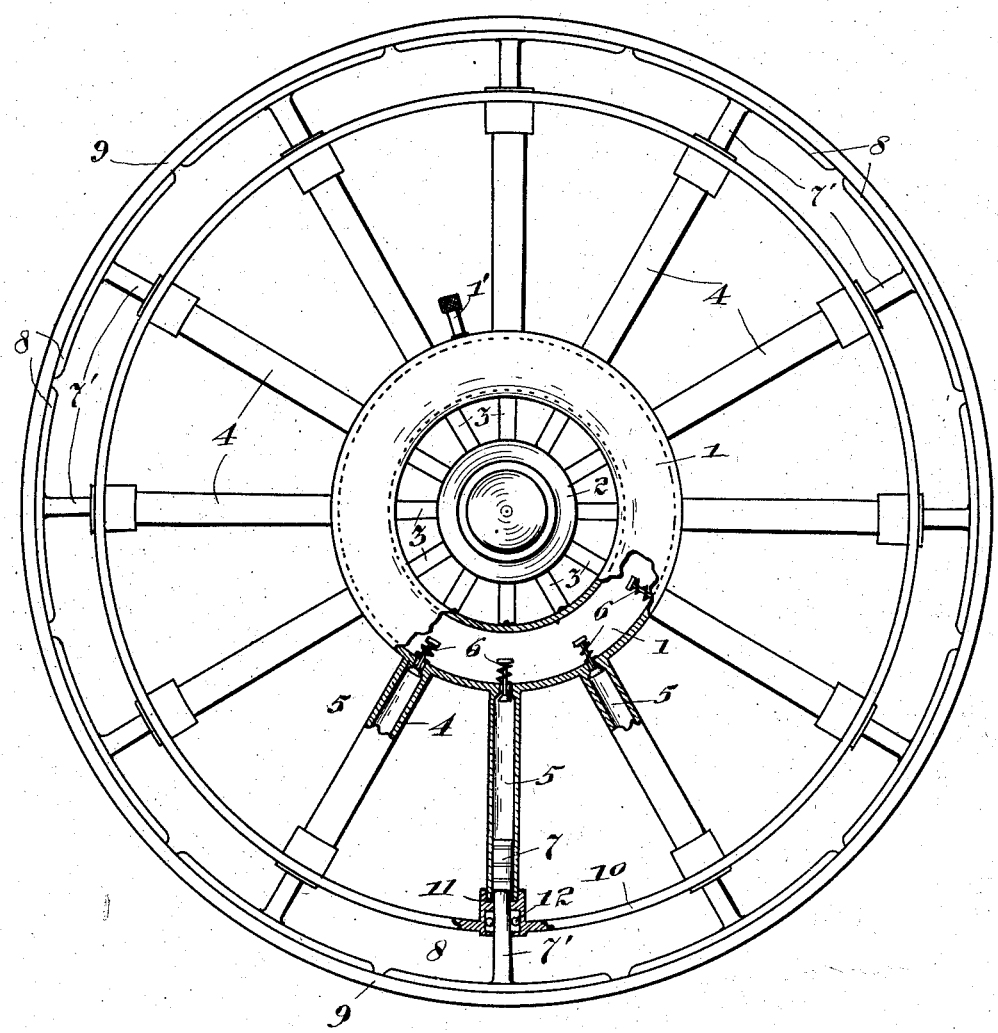

UNITED STATES PATENT OFFICE.

CHARLES A. LANGFORD, OF RIO, WISCONSIN.

RESILIENT WHEEL.

997,302.  Specification of Letters Patent.  Patented July 11, 1911.

Application filed July 28, 1910. Serial No. 574,364.

*To all whom it may concern:*

Be it known that I, CHARLES A. LANGFORD, a citizen of the United States, residing at Rio, county of Columbia, and State of Wisconsin, have invented certain new and useful Improvements in Resilient Wheels, of which the following is a specification.

My invention relates to improvements in resilient wheels and has for its object the provision of a resilient wheel which shall be pneumatic in action but nonpuncturable, and which shall be of simple construction and efficient in operation.

The invention consists of a combination and arrangement of parts hereinafter described and claimed.

The invention will be best understood by reference to the accompanying drawing forming a part of this specification, the same being a sectional elevation of a wheel embodying my invention.

The preferred form of construction as illustrated in the drawing, comprises an inner annular air chamber 1 provided with a valve nipple 1' for the introduction of compressed air therein. Chamber 1 is supported from the hub 2 by means of inner spokes 3 and carries outer spokes 4 radiating therefrom and provided with air cylinders 5 therein. Check valves 6 are interposed between cylinders 5 and air chamber 1 and arranged to permit passage of air from said air chamber to said cylinders, but prevent the return passage of the air. Mounted in cylinders 5 are pistons 7 carrying piston rods 7' having supporting heads or flanges 8 at their outer ends. A tread rim 9 of rubber or other suitable flexible material, is supported on heads 8. The outer ends of spokes 4 are connected together by rim 10 having bosses 11 arranged to receive the outer ends of said spokes and provided with ball bearings 12 arranged to contact with piston rods 7' and relieve lateral friction thereon. By this construction it will be observed that the tread rim 9 will be supported pneumatically without actual contact of the pneumatic support with the ground, and that air chambers 1 can be supplied with compressed air through nipple 1', the said compressed air being free to pass to the different spokes cylinders 5 but not free to pass from said spokes cylinders to said air chamber. By this arrangement a great intensity of pressure will be developed in each of the spokes cylinders by inward movements of pistons 7, inasmuch as the compression produced thereby is localized in the corresponding spokes 4.

While I have illustrated and described the preferred form of construction for carrying my invention into effect this is capable of variation or modification without departing from the spirit of the invention. I, therefore, do not wish to be limited to the exact details set forth, but desire to avail myself of such variations and modifications as come within the scope of the appending claim.

Having thus described my invention what I claim as new and desire to secure by Letters Patent is:

A resilient wheel comprising a hub, an annular air chamber encircling said hub and connected thereto, tubular spokes radiating from the outer wall of said chamber and made integral therewith, said chamber and said spokes being adapted to contain air under pressure, there being communicating passage ways between said spokes and said chamber, a rim connecting the outer ends of said spokes, integral spaced bosses on said rim provided with recesses to receive the ends of said spokes, an outer rim, a plurality of piston rods fixed to said outer rim and extending into said spokes, pistons in said spokes and fixed to said rods, said bosses being provided with elongated radially disposed recesses upon opposite sides of said rods, ball bearings in said recesses, and check valves at the inner ends of said spokes controlling said passage ways between the spokes and the chamber, whereby said passage ways are closed as the piston moves inwardly and open as the pistons move outwardly, substantially as described.

In testimony whereof I have signed my name to this specification in the presence of two subscribing witnesses.

CHARLES A. LANGFORD.

Witnesses:
ANDREW AMONDSON,
H. E. BEDLEY.

---

Copies of this patent may be obtained for five cents each, by addressing the "Commissioner of Patents, Washington, D. C."